Feb. 4, 1969 G. HESKESTAD 3,425,431
CONTROL APPARATUS AND METHODS
Filed March 29, 1965

INVENTOR
Gunnar Heskestad
BY
ATTORNEY

United States Patent Office 3,425,431
Patented Feb. 4, 1969

3,425,431
CONTROL APPARATUS AND METHODS
Gunnar Heskestad, East Brunswick, N.J., assignor to American Standard Inc., New York, N.Y., a corporation of Delaware
Filed Mar. 29, 1965, Ser. No. 443,416
U.S. Cl. 137—81.5     8 Claims
Int. Cl. F15c 1/00

This invention pertains to amplifiers and more particularly to fluid amplifiers.

Most present day ideas on amplification suggest electrical or electronic amplification. Electronically, amplification is generally performed by a weak control signal controlling the flow of electrical power in a stream of electrons. The most common examples of electronic amplifiers employ vacuum tubes or transistors. While such devices have high speeds of operation, they are subject to environmental hazards such as heat and radiation and often require a moderate amount of labor in fabrication and assembly.

However, there are many applications wherein the high operating speed of electronic devices is not required. To satisfy the requirement for rugged low speed amplifiers, there has been recently proposed a class of fluid control devices which operate somewhat analogously to vacuum tube triodes. In such devices, the source of electrons is replaced by a stream of fluid such as a liquid or a gas, and the source of fluid is controlled by a source of control fluid. Generally, a source of fluid under pressure (the power stream) is expelled from an orifice in the direction of a pair of laterally spaced outlets in a chamber. Under normal conditions, the fluid will equally divide between the two outlets. In the gap between the orifice and the outlets, and, more particularly in the region close to the orifice are a pair of oppositely disposed control jets. Therefore, as the expelled fluid crosses the chamber to the outlets, it moves past the control jets. If fluid is now expelled from one of the control jets, the power stream is deflected in the direction of movement of the control jet. Therefore, if the outlets are angularly aligned with control jets, the fluid in the power stream can be controllably diverted to a selected one of the outlets. It should be noted, however, that the amount of deflection is related to the ratios of the momentum of the power stream and the momentum of the fluid from the control jet. Therefore, to obtain reasonable deflection relatively high pressure control jets must be employed. Hence, with presently available fluid amplifiers relatively low amplifications are obtained and considerable cascading of fluid amplifiers is required to obtain a reasonable amount of amplification.

It is, accordingly, a general object of the invention to provide improved methods of fluid amplification.

It is another object of the invention to provide improved fluid amplifiers.

It is another object of the invention to provide improved fluid amplifiers which require considerably less control energy than required by presently available fluid amplifiers for reliable operation.

It is another object of the invention to provide a more efficient proportional type fluid amplifier.

It is yet another object of the invention to provide an improved and more efficient bistable amplifier.

Generally, the invention still contemplates the expelling of a fluid under pressure from an orifice toward an output region as with previously known amplifiers. However, the deflection of the power stream is accomplished in a different manner than the utilization of pressure control jets adjacent the pressurized fluid stream. Instead, suction is selectively applied to a portion of the periphery of the orifice. When this suction is applied, the stream of pressurized fluid bends over the edge of the orifice at the point where suction is applied, and the stream is, accordingly, deflected.

Other objects and the features and advantages of the invention will be apparent from the following detailed description when read together with the accompanying drawing which shows, by way of example and not limitation, several embodiments of the invention.

Figure 1:
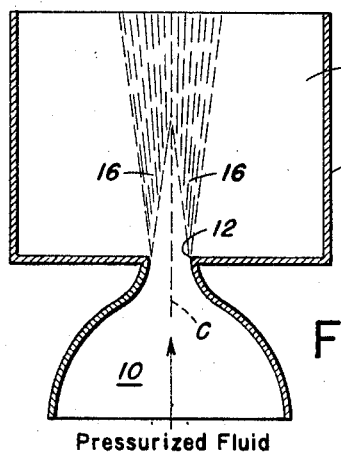
FIG. 1 is a sectional view of prior art apparatus wherein fluid under pressure is expelled from an orifice.

Referring now to FIG. 1, there is shown a prior art conduit system wherein fluid under pressure passes from a suitably shaped inlet conduit 10 through an orifice 12 into an outlet chamber 14. The system shown in FIG. 1 has rotational symmetry about the central or fluid flow axis C. As the fluid passes through the orifice 12 the usual turbulent mixing layers 16 are formed and merge into a substantially conical shape symmetrically about the axis C. The cross section of the cone continues expanding in the downstream direction but the flow remains symmetrical with respect to the central axis C until at a point downstream distant from the orifice 12 the turbulent mixing layers 16 contact the walls 18 of the outlet chamber.

Figure 2:
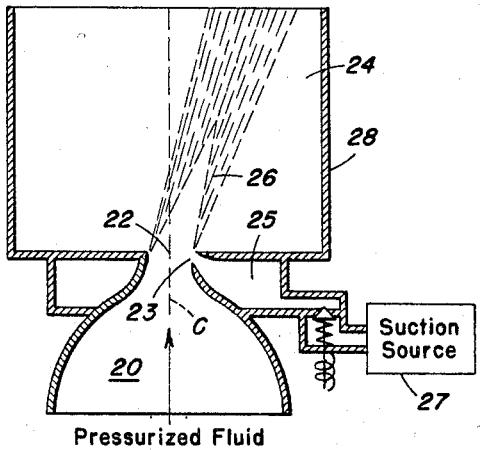
FIG. 2 is a sectional view of a fluid control system wherein fluid flowing from an orifice is deflected in accordance with the invention.
Figure 3:
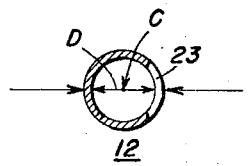
FIG. 3 is an enlarged top view of the orifice of FIG. 2.

In FIG. 2, the apparatus is similar to the apparatus of FIG. 1 except that lateral diversion of the fluid stream is obtained by applying suction to a portion of the periphery of the orifice 22. The system includes a suitably shaped inlet conduit 20 connected via an outlet orifice 22 to an outlet conduit 24. A portion of the peripheral edge of the outlet orifice 22 is provided with a slit 23 (see FIG. 3). The slit 23 communicates with a suction chamber 25 which is connected to a source of suction 27. With the source of suction 27 operating there is a diversion or deflection of the outlet stream of fluid. The fluid under pressure passing from inlet conduit 20 through outlet orifice 22 is laterally deflected from the central axis C in the traverse direction of the midpoint of the slit 23. As is seen in FIG. 2, the turbulent mixing layers are substantially symmetrical about an axis which tilts toward the right. This deflection persists at least as long as the source of suction 27 is operating.

Figure 4:
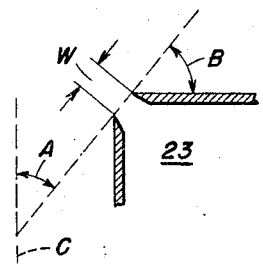
FIG. 4 is an enlarged sectional view of the peripheral edge of the orifice of FIG. 2 as well as the orifices of the devices of FIGS. 5 and 6.

When the dimensions of the slit are chosen according to the following criteria, optimum deflection of the output stream is obtained. The slit width W (FIG. 4) should be more than one-one hundredth of the width or diameter D (FIG. 3) of the outlet orifice 23. In addition, the angle of the inclination A of the slit 23 with respect to the central axis C (FIG. 4) should be in the range of zero to ninety degrees when the plane of the outlet orifice is perpendicular to the central axis C. Generally, the larger the inclination angle of the slit and the greater the width of the slit, the greater the deflection of the output stream. However, with larger inclination angles and slit widths, greater suction rates are required.

Figure 5:
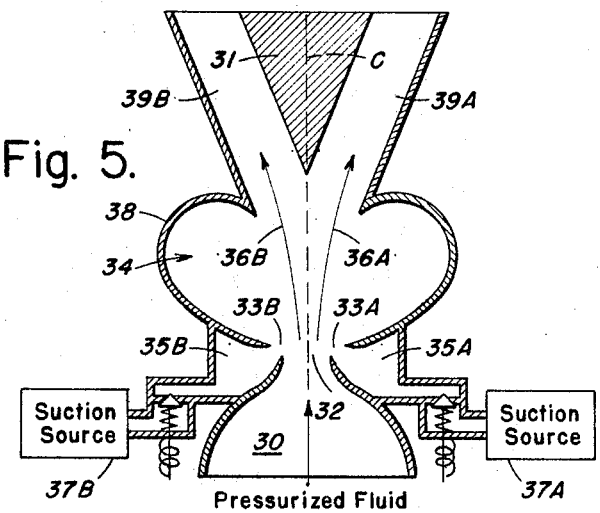
FIG. 5 is a view of a proportional type amplifier, partially in cross section and partially employing blocks.

The use of edge suction along the periphery of an outlet orifice can be used to control fluid amplifiers. Accordingly, FIG. 5 shows a proportional type amplifier. The amplifier includes an inlet power conduit 30 having an inlet adapted to receive fluid under pressure and an outlet orifice 32. The outlet orifice has a rectangular cross-section with an aspect ratio (depth to width) of one or greater. The center of the outlet orifice 32 is on the central axis C and the plane of the outlet orifice 32 is perpendicular to the central axis C. Power conduit 30 is shaped in the usual manner to provide a turbulent free stream of fluid for expulsion from the outlet orifice 32. The inlet of a chamber 34 is connected to the outlet orifice 32. Chamber 34 is provided with side walls 38 that are laterally displaced from the axis C so that the turbulent mixing layers of fluid indicated generally by the arrows 36A and 36B do not contact the side walls. A suitable shape for the chamber is generally cardiodal. The end of chamber 34 downstream from the output orifice 32 has two outlet regions 39A and 39B. Outlet regions 39A and 39B are laterally displaced from the central axis C and are positioned on opposite sides of an axial plane including the central axis C. The axial plane is perpendicular to the plane of the drawing. A fluid divider 31 separates the outlet region 39A from the outlet region 39B. In such a case, the stream of pressurized fluid expelled from outlet orifice 32, travels along the directions of the arrows 36 and divides, substantially equally, to exit via the outlet regions 39A and 39B. Proportional control and amplification is indicated by the difference in the fluid flow exiting from the outlet regions 39A and 39B. In order to obtain this proportional control, it is necessary to preferentially divert the fluid to one of the outlet regions. Diversion or deflection of the fluid flow is obtained, in accordance with the invention, by providing the outlet orifice 32 with slits in its peripheral edge and by the differential application of pressure to these slits. Therefore, slits 33A and 33B are disposed in the peripheral edge of outlet orifice 32. The slits are diametrally opposite each other and traversely aligned with the outlet regions 39. In particular, the slit 33A is on the same side of the axial plane including the central axis C as the outlet region 39A, and the slit 33B is on the same side of the axial plane including the central axis C as the outlet region 39B. The suction chambers 35 are respectively connected to sources of suction 37.

When no suction is applied to either of the slits 33 or when equal suction is applied thereto the stream of fluid expelled from outlet orifice 32 divides equally to exit via the outlet regions 39. However, when there exists a differential suction between the suction chambers 35, fluid is preferentially diverted to one of the outlet regions 39. For example, if the suction chamber 35A has applied thereto a greater rate of suction than the suction chamber 35B, more of the fluid will follow the stream line indicated by the arrow 36A and exit via the outlet region 39A. As the suction differential increases, more and more fluid exits via the outlet region 39A until all of the fluid exits from the region 39A. In other words, the amount of the fluid exiting from region 39A is proportional to the differential in suction applied to the slits 33.

In order to provide efficient operation of control by the slits 33, the slit width W is preferably more than one-one hundredth of the diameter D of the orifice 32 and the slit inclination angle A is between zero and ninety degrees.

While the proportional amplifier described with respect to FIG. 5 performs amplification in the usual sense, it is possible to modify the amplifier to provide a bistable amplifier, that is, an amplifier in which once the output stream is diverted to a particular channel the stream remains flowing in that channel until deflected to another channel. Such an amplifier is similar to flip-flops and trigger circuits in the electronic art. Such an amplifier utilizes the Coanda effect wherein fluid expelled under pressure into a chamber will, if disturbed, be deflected to a wall of the chamber downstream from the orifice and adhere to that wall until another disturbance deflects it to another wall.

Figure 6:
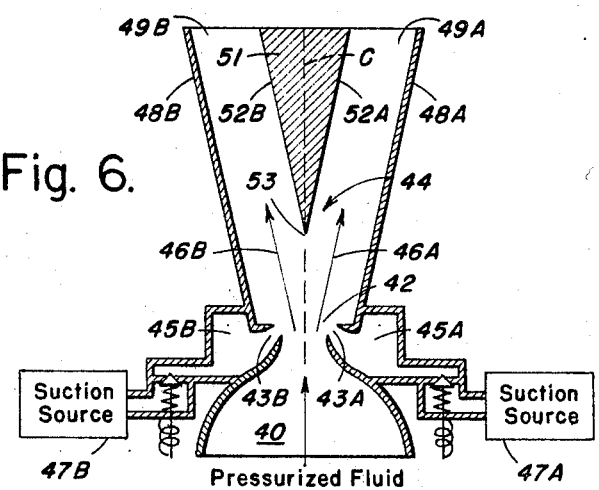
FIG. 6 is a side view, partially in section and partially employing blocks, of a bistable amplifier in accordance with another embodiment of the invention.

With this in mind, a bistable amplifier will be described with respect to FIG. 6. The amplifier comprises an input power conduit 40 having an inlet adapted to receive fluid under pressure and an outlet orifice 42. Outlet orifice 42 is of rectangular cross-section. The input power conduit 40 is so shaped that minimum turbulence is introduced into the fluid as it reaches the outlet orifice 42. The plane of the outlet orifice 42 is perpendicular to the central axis C and the center of the outlet orifice 42 is preferably disposed on central axis C. Connected to the inlet power conduit 40 is a chamber 44 including an inlet connected to the outlet orifice 42. Chamber 44 has side wall portions 48 that flare outwardly from the inlet. The portion of chamber 44 downstream from outlet orifice 42 is provided with two outlets 49 which are radially displaced from the central axis C, and on either side of the axial plane including said central axis. Extending into chamber 44 is a fluid divider 51. Fluid divider 51 is wedge-shaped and has side wall portions 52 that are opposite the side wall portions 48 of chamber 44. The side wall portions 52 converge to a point 53 on the central axis and face the outlet orifice 42. Therefore, the side wall portions 52 of divider 51 cooperating with the side wall portions 48 of chamber 44 provide two channels which exit at the outlets 49. Fluid expelled from outlet orifice 42 will travel in either one of the channels as indicated by stream lines 46. However, because of the Coanda effect, the expelled fluid will only travel in either one of the channels. In order to divert the expelled fluid controllably to a selected channel the peripheral edge of outlet orifice 42 is provided with a pair of slits 43. Slits 43 are diametrally disposed about the periphery of outlet orifice 42. Slit 43A is on the same side of the axial plane as the channel defined by wall portion 48A and wall portion 52A; and slit 43B is on the same side of axial plane as the channel defined by wall portion 48B and wall portion 52B. Each of the slits 43 is respectively connected to a suction chamber 45 and the suction chambers are respectively connected to suction sources 47. For example, suction source 47A applies suction to suction chamber 45A which is connected to slit 43A.

In operation, the output stream will exit from one of the outlets 52 depending on some previous transient condition. Assume that the fluid is exiting via outlet 49A. The fluid will continue to exit from that outlet until a suction pulse from source 47B is applied to suction chamber 45B. The suction created in chamber 45B introduces edge suction at the slit 43B and the stream will be diverted from the outlet 49A and will follow the stream line 46B to the outlet 49B. The state of the device will remain so until a suction pulse is applied to the suction chamber 45A by the suction source 47A. At that time, the outlet stream will swing over to follow stream line 46A to the outlet 49A.

In other words, the stream locks into one of two stable states and remains in that state until forcibly diverted to the other state. In order to provide efficient utilization of the suction pulses, the slit width W should be preferably more than one-one hundredth of the orifice diameter D, and the slit inclination A should be in the range from zero to ninety degrees.

There has thus been shown improved apparatus and methods for fluid diversion which employs suction selectively applied to portions of the peripheral edge of an outlet orifice. The use of suction instead of the conventional pressure control jets provides a more efficient device because of the amount of input control energy required to control the diversion of the outlet stream is minimized. Not only has the general concept of the selective application of edge suction been disclosed for stream diversion but there has also been shown and described a proportional type fluid amplifier and a bistable amplifier utilizing the edge suction phenomena.

While only several embodiments of the invention have been shown and described in detail, there will now be obvious to those skilled in the art many modifications and variations satisfying any, or all, of the objects of the invention but which do not depart from the spirit thereof, as defined in the appended claims.

What is claimed is:

1. A proportional fluid amplifier comprising: an inlet power conduit including an inlet adapted to receive fluid under pressure and an outlet orifice of rectangular cross-section, the walls of said inlet being tapered continuously to a smaller dimension in the direction of flow so that the flow of fluid will be substantially free of turbulence upon entrance into the outlet orifice, the center of said outlet orifice being on a central axis perpendicular to the plane of said outlet orifice; a chamber including an inlet connected to said outlet orifice and first and second outlet regions downstream from said outlet orifice, said chamber including sidewall portions laterally displaced from said central axis and the peripheral edge of said outlet orifice so that fluid under pressure can flow from said inlet to either of said outlet regions without contacting said sidewall portions, said outlet regions being disposed on either side of a plane including said control axis; said outlet orifice being provided with first and second slits in the peripheral edge thereof, said first slit being on the same side of said plane as said first outlet region and said second slit being on the same side of the plane including said axis as said second outlet region; and means for applying suction differentially to said slits so that the fluid flowing from said outlet orifice is diverted, by bending over said peripheral edge, toward the outlet region of said chamber on the same side of said plane including said axis as the slit subjected to the greater suction.

2. A proportional fluid amplifier comprising: an inlet power conduit including an inlet adapted to receive fluid under pressure and an outlet orifice of rectangular cross-section, the walls of said inlet being tapered continuously to a smaller dimension in the direction of flow so that the flow of fluid will be substantially free of turbulence upon entrance into the outlet orifice, the center of said outlet orifice being on a central axis perpendicular to the plane of said outlet orifice; a chamber including an inlet connected to said outlet orifice and first and second outlet regions downstream from said outlet orifice, said chamber including sidewall portions laterally displaced from said central axis and the peripheral edge of said outlet orifice so that fluid under pressure can flow from said inlet to either of said outlet regions without contacting said sidewall portions, said outlet regions being disposed on either side of an axial plane including said central axis; said outlet orifice being provided with first and second slits in the peripherai edge thereof, said first slit being on the same side of said axial plane as said first outlet region and said second slit being on the same side of said axial plane as said second outlet region, each of said slits having a width more than one-one hundredth of the width of said outet orifice; and means for applying suction differentially to said slits so that the fluid flowing from said outlet orifice is diverted, by bending over said peripheral edge, toward the outlet region of said chamber on the same side of said axial plane as the slit subjected to the greater suction.

3. A proportional fluid amplifier comprising: an inlet power conduit including an inlet adapted to receive fluid under pressure and an outlet orifice, the walls of said inlet being tapered continuously to a smaller dimension in the direction of flow so that the flow of fluid will be substantially free of turbulence upon entrance into the outlet orifice, the center of said outlet orifice being on a central axis perpendicuar to the plane of said outlet orifice; a chamber including an inlet connected to said outlet orifice and first and second outlet regions downstream from said outlet orifice, said chamber including sidewall portions laterally displaced from said central axis and the peripheral edge of said outlet orifice so that fluid under pressure can flow from said inlet to either of said outlet regions without contacting said sidewall portions, said outlet regions being disposed on opposite sides of an axial plane including said central axis; said outlet orifice being provided with first and second slits in the peripheral edge thereof, said first slit being on the same side of said axial plane as said first outlet region and said second slit being on the same side of said axial plane as said second outlet region, each of said slits having an angle of inclination of between zero and ninety degrees; and means for applying suction differentially to said slits so that the fluid flowing from said outlet orifice is diverted, by bending over said peripheral edge, toward the outlet region of said chamber on the same side of said axial plane as the slit subjected to the greater suction.

4. A proportional fluid amplifier comprising: an inlet power conduit including an inlet adapted to receive fluid under pressure and an outlet orifice, the walls of said inlet being tapered continuously to a smaller dimension in the direction of flow so that the flow of fluid will be substantially free of turbulence upon enterance into the outlet orifice, the center of said outlet orifice being on a central axis perpendicular to the plane of said outlet orifice; a chamber including an inlet conected to said outlet orifice and first and second outlet regions downstream from said outlet orifice, said chamber including sidewall portions laterally displaced from said central axis and the peripheral edge of said outlet orifices so that fluid under pressure can flow from said inlet to either of said outlet regions without contacting said sidewall portions, said outlet regions being disposed on opposite sides of an axial plane including said central axis; said outlet orifice being provided with first and second slits in the peripheral edge thereof, said first slit being on the same side of said axial plane as said first outlet region and said second slit being on the same side of said axial plane as said second outlet region, each of said slits having a width more than one-one hundredth of the width of said outlet orifice and an angle of inclination of between zero and ninety degrees; and means for applying suction differentially to said slits so that the fluid flowing from said outlet orifice is diverted, by bending over said peripheral edge, toward the outlet region of said chamber on the same side of said axial plane as the slit subjected to the greater suction.

5. A bistable fluid amplifier comprising: an input power conduit including an inlet adapted to receive fluid under pressure and an outlet orifice, the walls of said inlet being tapered continuously to a smaller dimension in the direction of flow so that the flow of fluid will be substantially free of turbulence upon entrance into the outlet orifice, the center of said outlet orifice being on a central axis perpendicular to the plane of said outlet orifice; a chamber including an inlet connected to the peripheral edge of said outlet orifice, side wall portions set back from said peripheral edge and flaring outwardly from said inlet, and first and second outlets downstream from said inlet and disposed on opposite sides of an axial plane including said central axis; a fluid divider extending into said chamber, said fluid divider including side wall portions opposite the side wall portions of said chamber and converging to a point on said central axis facing said outlet orifice and downstream therefrom, the oppositely disposed side wall portions of said chamber and said fluid divider cooperating to provide first and second fluid outlet channels exiting at said first and second outlets of said chamber; said side wall portions of said chamber and said fluid divider being disposed with respect to said outlet orifice so that when fluid from said outlet orifice flows in one of said outlet channels said flow continues until diverted to the other of said outlet channels; said peripheral edge of said outlet orifice being provided with first and second slits, said first slit being on the same side of said axial plane as said first outlet channel and said second slit being on the same side of said axial plane as said second channel; and means for selectively applying suction to said slits so that when suction is applied to one of said slits, fluid flowing from said outlet orifice is diverted, by bending over said peripheral edge, to the outlet channel on the same side of said axial plane.

6. A bistable fluid amplifier comprising: an input power conduit including an inlet adapted to receive fluid under pressure and an outlet orifice, the walls of said inlet being tapered continuously to a smaller dimension in the direction of flow so that the flow of fluid will be substantially free of turbulence upon entrance into the outlet orifice, the center of said outlet orifice being on a central axis perpendicular to the plane of said outlet orifice; a chamber including an inlet connected to the peripheral edge of said outtlet orifice, side wall portions set back from said peripheral edge and flaring outwardly from said inlet, and first and second outlets downstream from said inlet and disposed on opposite sides of an axial plane including said central axis; a fluid divider extending into said chamber, said fluid divider including side wall portions opposite the side wall portions of said chamber and converging to a point on said central axis facing said outlet orifice and downstream therefrom, the oppositely disposed side wall portions of said chamber and said fluid divider cooperating to provide first and second fluid outlet channels exiting at said first and second outlets of said chamber; said side wall portions of said chamber and said fluid divider being disposed with respect to said outlet orifice so that when fluid from said outlet orifice flows in one of said outlet channels said flow continues until diverted to the other of said outlet channels; said peripheral edge of said outlet orifice being provided with first and second slits, said first slit being on the same side of said axial plane as said first outlet channel and said second slit being on the same side of said axial plane as said second channel; each of said slits having a width more than one-one hundredth of the width of said outlet orifice; and means for selectively applying suction to said slits so that when suction is applied to one of said slits, fluid flowing from said outlet orifice is diverted, by bending over said peripheral edge, to the outlet channel on the same side of said axial plane.

7. A bistable fluid amplifier comprising: an input power conduit including an inlet adapted to receive fluid under pressure and an outlet orifice, the walls of said inlet being tapered continuously to a smaller dimension in the direction of flow so that the flow of fluid will be substantially free of turbulence upon entrance into the outlet orifice, the center of said outlet orifice being on a central axis perpendicular to the plane of said outlet orifice; a chamber including an inlet connected to the peripheral edge of said outlet orifice, side wall portions set back from said peripheral edge and flaring outwardly from said inlet, and first and second outlets downstream from said inlet and disposed on opposite sides of an axial plane including said central axis; a fluid divider extending into said chamber, said fluid divider including side wall portions opposite the side wall portions of said chamber and converging to a point on said central axis facing said outlet orifice and downstream therefrom, the oppositely disposed side wall portions of said chamber and said fluid divider cooperating to provide first and second fluid outlet channels exiting at said first and second outlets of said chamber; said side wall portions of said chamber and said fluid divider being disposed with respect to said outlet orifice so that when fluid from said outlet orifice flows in one of said outlet channels said flow continues until diverted to the other of said outlet channels; said peripheral edge of said outlet orifice being provided with first and second slits, said first slit being on the same side of said axial plane as said first outlet channel and said second slit being on the same side of said axial plane as said second channel, each of said slits having an angle of inclination of between zero and ninety degrees; and means for selectively applying suction to said slits so that when suction is applied to one of said slits, fluid flowing from said outlet orifice is diverted, by bending over said peripheral edge, to the outlet chanel on the same side of said axial plane.

8. A bistable fluid amplifier comprising: an input power conduit including an inlet adapted to receive fluid under pressure and an outlet orifice, the walls of said inlet being tapered continuously to a smaller dimension in the direction of flow so that the flow of fluid will be substantially free of turbulence upon entrance into the outlet orifice, the center of said outlet orifice being on a central axis perpendicular to the plane of said outlet orifice; a chamber including an inlet connected to the peripheral edge of said outlet orifice, side wall portions set back from said peripheral edge and flaring outwardly from said inlet, and first and second outlets downstream from said inlet and disposed on opposite sides of an axial plane including said central axis; a fluid divider extending into said chamber, said fluid divider including side wall portions opposite the side wall portions of said chamber and converging to a point on said central axis facing said outlet orifice and downstream therefrom, the oppositely disposed side wall portions of said chamber and said fluid divider cooperating to provide first and second fluid outlet channels exiting at said first and second outlets of said chamber; said side wall portions of said chamber and said fluid divider being disposed with respect to said outlet orifice so that when fluid from said outlet orifice flows in one of said outlet channels said flow continues until diverted to the other of said outlet channels; said peripheral edge of said outlet orifice being provided with first and second slits, said first slit being on the same side of said axial plane as said first outlet channel and said second slit being on the same side of said axial plane as said second channel; each of said slits having a width more than one-one hundredth of the width of said outlet orifice and an angle of inclination of between zero and ninety degrees; and means for selectively applying suction to said slits so that when suction is applied to one of said slits, fluid flowing from said outlet orifice is diverted, by bending over said peripheral edge, to the outlet channel on the same side of said axial plane.

References Cited

UNITED STATES PATENTS

| | | | |
|---|---|---|---|
| 3,030,979 | 4/1962 | Reilly | 137—81.5 |
| 3,144,309 | 8/1964 | Sparrow. | |
| 3,148,691 | 9/1964 | Greenblott | 137—81.5 |
| 3,187,763 | 6/1965 | Adams | 137—81.5 |
| 3,238,959 | 3/1966 | Bowles | 137—81.5 |
| 3,240,220 | 3/1966 | Jones | 137—81.5 |
| 3,266,513 | 8/1966 | Voit | 137—81.5 |
| 3,285,262 | 11/1966 | Ernst et al. | 137—81.5 |

SAMUEL SCOTT, *Primary Examiner.*